United States Patent [19]

Hill

[11] Patent Number: 4,782,971

[45] Date of Patent: Nov. 8, 1988

[54] DEVICE FOR PREVENTING THE UNAUTHORIZED USE OF AN ELECTRICAL APPARATUS

[76] Inventor: Mary V. Hill, 3104 Firewood Dr., Colorado Springs, Colo. 80918

[21] Appl. No.: 84,078

[22] Filed: Aug. 11, 1987

[51] Int. Cl.[4] .................................... H02G 3/02

[52] U.S. Cl. .................................... 220/3.2; 361/391; 439/133

[58] Field of Search ......... 70/57, 58, 85, 86, 167–169; 200/43.22; 220/242; 307/116, 119; 312/215, 216, 348; 340/568, 570; 361/338, 391, 428; 439/133–135

[56] References Cited

U.S. PATENT DOCUMENTS 2,643,787 6/1953 Rockman .................... 439/133

*Primary Examiner*—A. D. Pellinen

*Assistant Examiner*—Gregory D. Thompson

[57] ABSTRACT

A lock box for preventing unauthorized use of electrical appliances is disclosed. The lock box is adapted to receive the plug end of an electrical cord to prevent the appliance from being plugged into an electrical socket. The lock box includes a drawered cabinet arrangement wherein the drawer has a slot sized and shaped such that the electrical cord, but not the plug itself, may freely pass therethrough. A locking mechanism is provided to facilitate locking the drawer with the plug closed inside, thereby preventing unauthorized use. The lock box does not contain any electrical parts and therefor may be safely used in virtually any environment. A method of preventing the unauthorized use of electrical appliances is also disclosed.

10 Claims, 2 Drawing Sheets

DEVICE FOR PREVENTING THE UNAUTHORIZED USE OF AN ELECTRICAL APPARATUS

BACKGROUND OF THE INVENTION

The present invention relates generally to a device that prevents unauthorized use of an electrical appliance. More particularly, the present invention relates to a lockable box adapted to receive the plug end of a cord from an electrical appliance to prevent its insertion into an electrical outlet.

Parents may wish to prevent their children from using many electrical appliances contained in the modern household for various reasons such as safety, control, and discipline. For example, a parent may desire to restrict a child's use of the television, VCR or radio so that the child may use the device only at approved times. This control is important especially for those broadcasts or channels having violent, sexual or immoral themes, which parental discretion dictates must be unavailable for viewing by their children. Similarly there are other electrical apparatus in the average household which might be dangerous in the hands of inexperienced operators such as young children. These other devices include items ranging from shop equipment to curling irons. While parents may instruct their children not to use various electrical appliances, it is difficult to monitor the children's use of those appliances, especially when the parents are not at home. The need to prevent unauthorized use of electrical appliances and other electrical apparatus extends far beyond household applications into schools, businesses and many other environments, especially when potentially dangerous machines are involved. Consequently, there is a need for a simple, inexpensive device that can effectively prevent unauthorized use of electrical apparatus

SUMMARY OF THE INVENTION

To achieve the foregoing and other objects and in accordance with the purpose of the present invention, a mechanical lock box is provided that is adapted to receive a plug end of a cord from an electrical appliance to prevent use of that appliance. The lock box is similar in form to a single drawered cabinet and includes a substantially enclosed box shaped housing having a top wall and an open end. A catch stop protrudes downwardly from the top wall into the interior of the housing near the open end. A sliding drawer is provided that is adapted to slide into the housing through its open end. The drawer includes a front panel, a rear panel and a pair of side panels. The front panel of the drawer includes an elongated slot extending down from the top surface of the front panel that is sized large enough to allow the cord but not the plug to pass freely therethrough when the drawer is shut.

A key operated lock is provided on the front panel to allow the parent to lock the drawer with the plug inside, thereby insuring that the electrical appliance will not be used. Preferably, the lock possesses an interior arm which may be rotated within the lock box to engage the catch stop thereby preventing the drawer from being opened. A handle is also provided on the exterior surface of the drawer's front panel to accommodate opening and closing the sliding drawer. Preferably, the front and rear panels of the drawer extend slightly higher than its side walls, thereby forming raised lips on both the front and back ends of the drawer. These raised lips are adapted to engage the catch stop to limit the motion of the drawer within the housing, thereby preventing the drawer from falling out at inappropriate times.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawing in which:

DETAILED DESCRIPTION OF THE DRAWINGS

Figure 1:
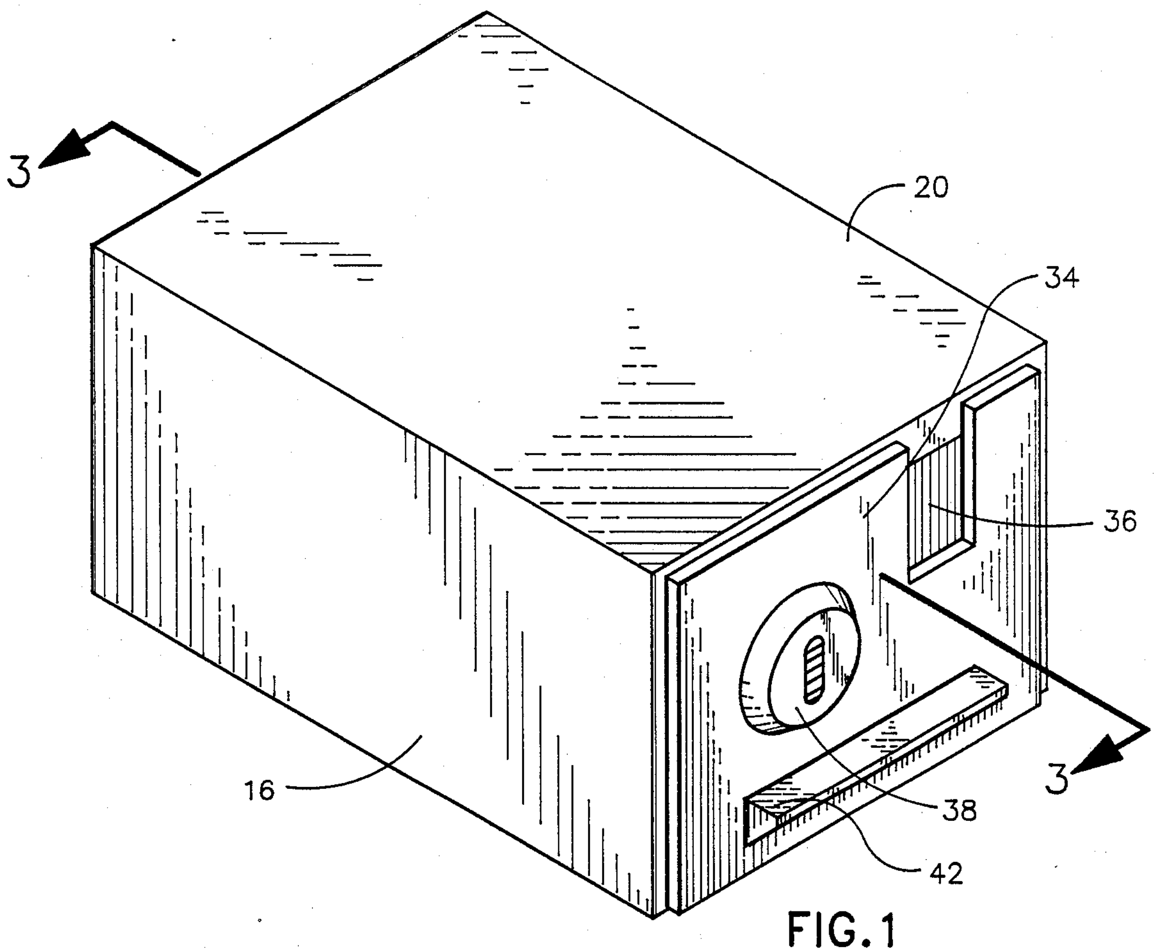
FIG. 1 is a perspective view of a closed lock box according to one embodiment of the present invention.

As illustrated in the drawings, lock box includes two major components, a substantially box-shaped housing 10 and a conformingly shaped drawer 12. The housing 10 includes a rear wall 14, two opposing side walls 16, 18, a top wall 20, a bottom wall 22, and an open front end. A catch stop 24 protrudes downwardly from the top wall 20 of the housing 10 near the open front end thereof. The drawer 12 slides into the housing 10 through its open end in the same manner as a drawer in a filing cabinet. The drawer 12 is large enough to receive at least one plug end and preferably several plug ends of associated electrical cords. The drawer 12 includes rear panel 26, two opposing side panels 28, 30, a bottom panel 32, and a front panel 34. The front panel 34 includes an elongated slot 36 that is adapted to receive a cord from an electrical appliance. The elongated slot 36 preferably extends downwardly from the upper edge or surface of front panel 34 and is preferably in the range of one-quarter inch to one-half wide and three-quarters inch to one and one-half inches deep. The elongated slot 36 must be large enough to allow electrical cords from ordinary household electrical appliances to pass therethrough, but small enough to prevent the plug from so passing. A mechanical locking device 38 is also mounted on the front panel 34 to allow the parent to lock the drawer 12 to the housing 10 with the plug inside the drawer 12 and the cord extending through the elongated slot 36. Although any standard locking device could be used, as plastic barrel lock having an elongated rotatable locking arm 40 is preferred. With this arrangement, the locking arm 40 is adapted to selectively engage the catch stop 24 protruding downwardly from the top wall 20 of housing 10. Thus, when a corresponding key is inserted in the keyhole portion of the lock 38 and turned, the locking arm 40 rotates upwardly and engages behind the catch stop 24. A handle 42 is also provided on the front surface of front panel 34 to facilitate sliding the drawer 12 in and out of housing 10. It will be apparent that front panel 34 constitutes the front of the lock box when the drawer 12 is completely retained within the housing 10. Thus, the front panel 34 preferably is dimensioned substantially the same as the dimensions of the open front end of housing 10.

Figure 3:
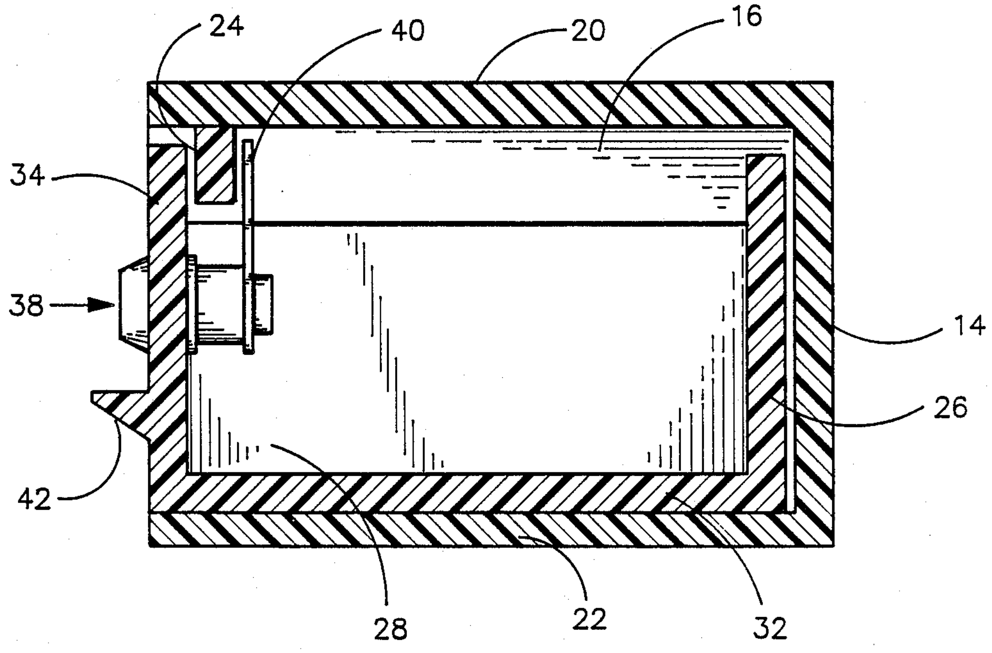
FIG. 3 is a cross-sectional view of the lock box taken along line 3—3 of FIG. 1.
Figure 2:
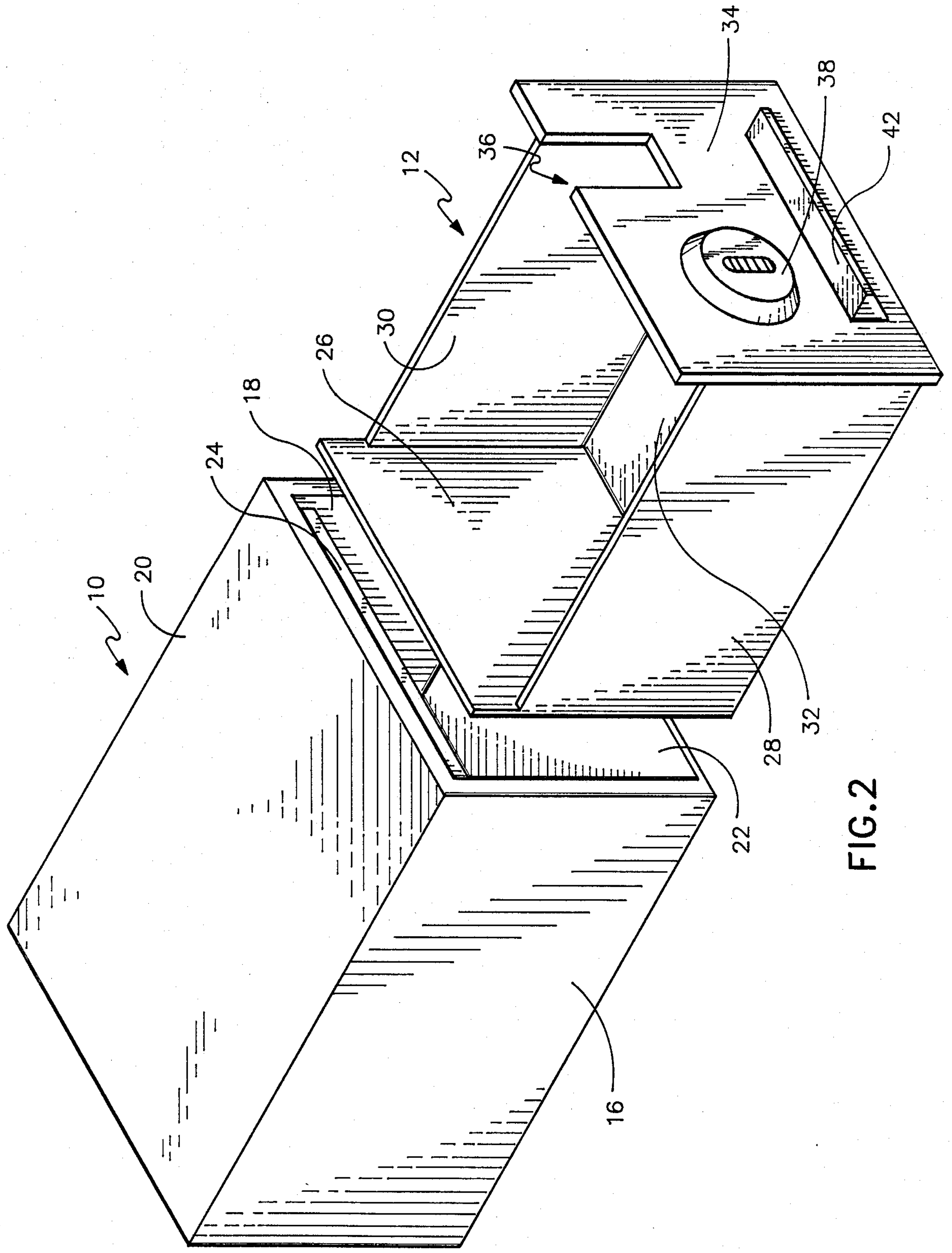
FIG. 2 is an exploded perspective view of the lock box shown in FIG. 1.

To prevent the drawer 12 from inadvertently falling out of housing 10 when the locking arm 40 is rotated out of the locking position shown in FIG. 3, the rear panel 26 of the drawer 12 is of sufficient height to engage catch stop 24 in normal operating conditions. Rear panel 26 is also low enough so that the drawer 12 may be completely withdrawn from the housing 10 simply by tilting the drawer 12 upwards and thereby allowing rear panel 26 to pass underneath catch stop 24. Side panels 28, 30 are sized and positioned such that catch stop 24 does not interfere with their translation under normal operating conditions.

The lock box may be of any size as long as the interior space within drawer 12 is large enough to receive at least one standard household electrical plug. An appropriate size for the housing 10 is two and one-half inches high by three and one-half inches wide by four and three-quarters inches long. The lock box may be fashioned from a high impact plastic, preferably a suitable thermoplastic material such as polystyrene. Such materials are available in a wide variety of colors and may be easily worked into a desired shape using conventional injection molding techniques.

To operate the device, the parent merely unplugs the electrical appliance and inserts the associated plug into open drawer 12 with the associated electrical cord protruding through the elongated slot 36. The drawer 12 is then pushed shut and the key is inserted and rotated in the lock 38 thereby rotating locking arm 40 to the position shown in Fig. 3 and thereby locking the plug within the lock box. By locking the plug within lock box, children will prevented from using the associated electrical appliance.

Although only one embodiment of the present invention has been disclosed herein, it will be understood by those skilled in the art that the present invention may be embodied in many other specific forms without departing from the spirit or scope of the invention. Particularly, it should be noted that the exterior of lock box could be fashioned in the form of a decorated box that may have independent consumer appeal and blend with the decor of a particular house. For example, the decorated box could take the form of popular TV or movie characters or other characters from fairly tales, books and records. Similarly the size and shape of any of the components could be altered, so long as the basic requirements defined above are met. Moreover, a substantially enclosed housing including a hinge lid having a slot and a lock could be used. Also, the slot could extend through the housing from the front end thereof instead of extending through the front panel of the drawer. Therefore, the present examples and embodiments, are to be considered as illustrative and not restrictive, and the invention is not to be limited to the details given herein, but may be modified within the scope of the appended claims.

What is claimed is:

1. A lock box adapted for receiving a plug attached to a cord from an electrical apparatus to prevent the use of the apparatus, said lock box comprising:
- a substantially enclosed housing including a top wall and an open end;
- a drawer adapted to slide into and out of said housing through said open end, said drawer including a front panel, a back panel, and a pair of side panels;
- a catch stop protruding downwardly from said top wall into the interior of said housing, said catch stop being positioned adjacent to said open end;
- a slot in communication with an edge of said front panel of said drawer, said slot being sized large enough to allow the cord to freely pass therethrough, but small enough to prevent the plug from passing therethrough when the drawer is shut; and
- a key operated barrel lock mounted on said front panel that selectively engages said catch stop to selectively prevent said drawer from being slid open.

2. A lock box as recited in claim 1 wherein said back panel engages said catch stop when said drawer is slid out of said housing and wherein said drawer must be tilted with respect to said housing in order to detach said drawer from said housing.

3. A lock box as recited in claim 2 wherein the dimensions of said slot are substantially in the range of one-quarter inch to one-half inch wide and in the range of three-quarters inch to one and one-half inches long.

4. A lock box as recited in claim 3 further comprising a handle disposed on said front panel of said drawer to facilitate sliding said drawer.

5. A lock box as recited in claim 4 wherein said housing and said drawer are fashioned from plastic.

6. A lock box as recited in claim 5 wherein said housing and said drawer are fashioned from polystyrene.

7. A lock box adapted for receiving a plug attached to a cord from an electrical apparatus to prevent the use of the apparatus, said lock box comprising:
- a substantially enclosed housing including a top wall and an open end;
- a drawer adapted to slide into and out of said housing through said open end, said drawer including a front panel, a back panel, and a pair of side panels;
- a catch stop protruding downwardly from said top wall into the interior of said housing, said catch stop being positioned adjacent to said open end such that said back panel engages said catch stop when said drawer is slid out of said housing and wherein said drawer must be tilted with respect to said housing in order to detach said drawer from said housing.
- a slot in communication with an edge of said front panel of said drawer, said slot being sized large enough to allow the cord to freely pass therethrough, but small enough to prevent the plug from passing therethrough when the drawer is shut; and
- a lock adapted to selectively prevent said drawer from being slid open.

8. A lock box as recited in claim 7 wherein said lock comprises a key operated barrel lock mounted on said front panel that selectively engages said catch stop to prevent said drawer from being slid open.

9. A lock box as recited in claim 7 wherein the dimensions of said slot are substantially in the range of one-quarter inch to one-half inch wide and in the range of three-quarters inch to one and one-half inches long.

10. A lock box as recited in claim 9 further comprising a handle disposed on said front panel of said drawer to facilitate sliding said drawer.

* * * * *